United States Patent [19]
Sasamoto et al.

[11] Patent Number: 6,064,541
[45] Date of Patent: May 16, 2000

[54] SERVO PATTERN WRITING METHOD FOR MAGNETIC DISK DRIVES, AND MAGNETIC DISK DRIVE ADOPTING THE METHOD

[75] Inventors: Tatsuro Sasamoto; Isamu Tomita; Keiji Aruga, all of Kawasaki, Japan

[73] Assignee: Fujitsu Limited, Kawasaki, Japan

[21] Appl. No.: 08/848,138

[22] Filed: Apr. 28, 1997

[30] Foreign Application Priority Data

Dec. 10, 1996 [JP] Japan ..................................... 8-329708

[51] Int. Cl.⁷ .................................................. G11B 5/596
[52] U.S. Cl. ..................................... 360/77.05; 360/77.08
[58] Field of Search .................................. 360/75, 77.05, 360/77.08, 51, 15, 77.04

[56] References Cited

U.S. PATENT DOCUMENTS

| | | |
|---|---|---|
| 4,669,004 | 5/1987 | Moon et al. . |
| 5,485,322 | 1/1996 | Chainer et al. . |
| 5,570,247 | 10/1996 | Brown et al. . |
| 5,606,469 | 2/1997 | Kosugi et al. ............................. 360/75 |

FOREIGN PATENT DOCUMENTS

| | | |
|---|---|---|
| 0327207 | 8/1989 | European Pat. Off. . |
| 62-12972 | 1/1987 | Japan . |
| 1439551 | 6/1976 | United Kingdom . |
| 9207355 | 4/1992 | WIPO . |

*Primary Examiner*—Thang V. Tran
*Attorney, Agent, or Firm*—Greer, Burns & Crain, Ltd.

[57] ABSTRACT

Disclosed are a servo pattern writing method for magnetic disk drives making it possible to write a high-density and easily controllable servo pattern with high producibility, and a magnetic disk drive in which a servo pattern is written according to the method. The servo pattern writing method for magnetic disk drives in which a servo pattern is written on a plurality of surfaces in a magnetic disk drive having the plurality of surfaces comprises a step of writing a master servo pattern on a master surface that is one of the plurality of surfaces, and a step of writing a servo pattern on the surfaces other than the master surface while performing positioning on the basis of the master servo pattern. The master servo pattern contains a pattern identical to the servo pattern to be written on the surfaces other than the master surface. The master servo pattern is written before the master surface is incorporated in a main unit of the magnetic disk drive. Part of the master servo pattern other than the pattern identical to the servo pattern is deleted after the servo pattern is written on the surfaces other than the master surface.

22 Claims, 18 Drawing Sheets

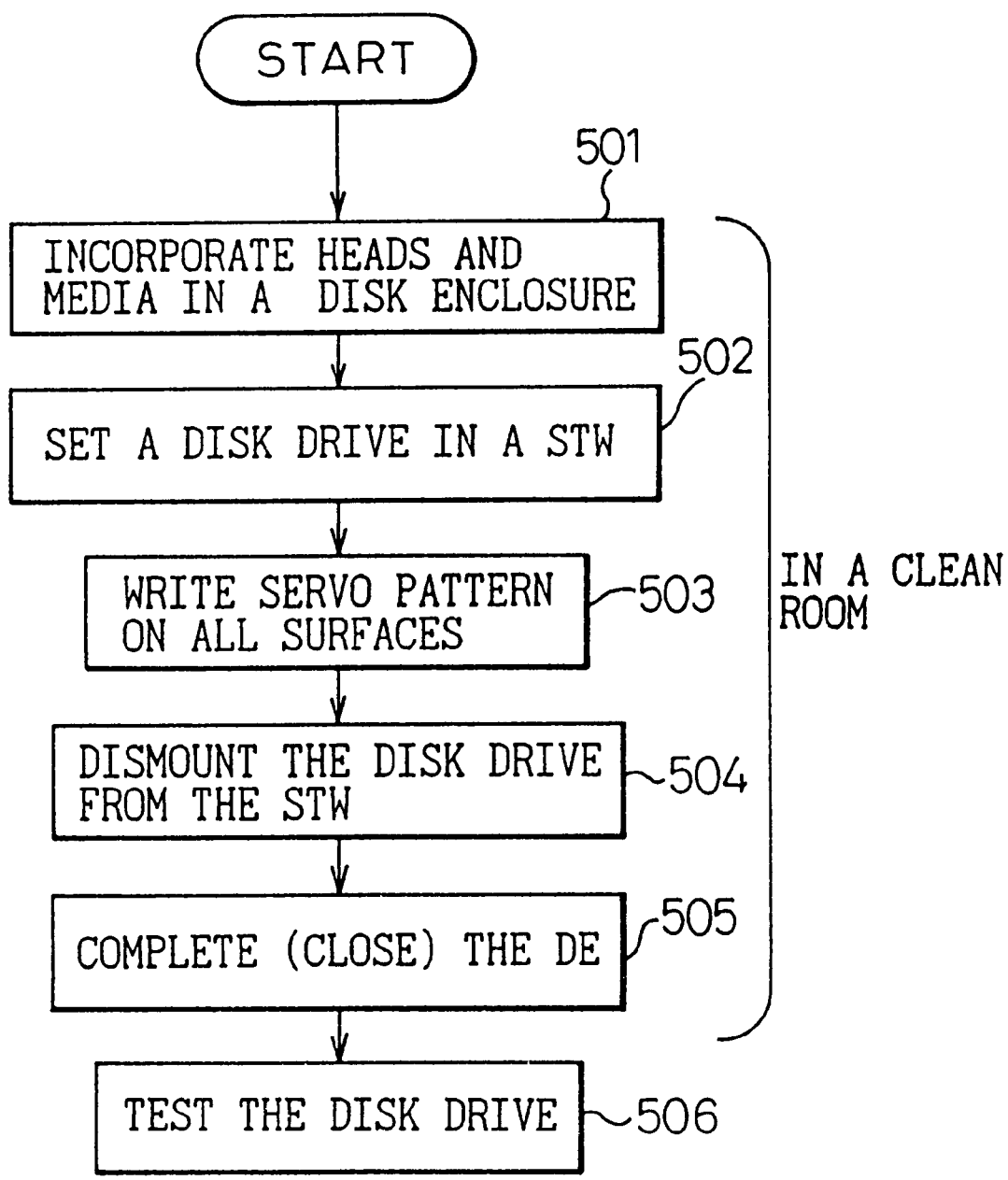

Fig.12

| SAMPLING RATE | GAIN-CROSSOVER FREQUENCY | TOLERANCE OF PHASE |
|---|---|---|
| 9.6kHz | 600Hz | 40° |
| 19.2kHz | 800Hz | 40° |

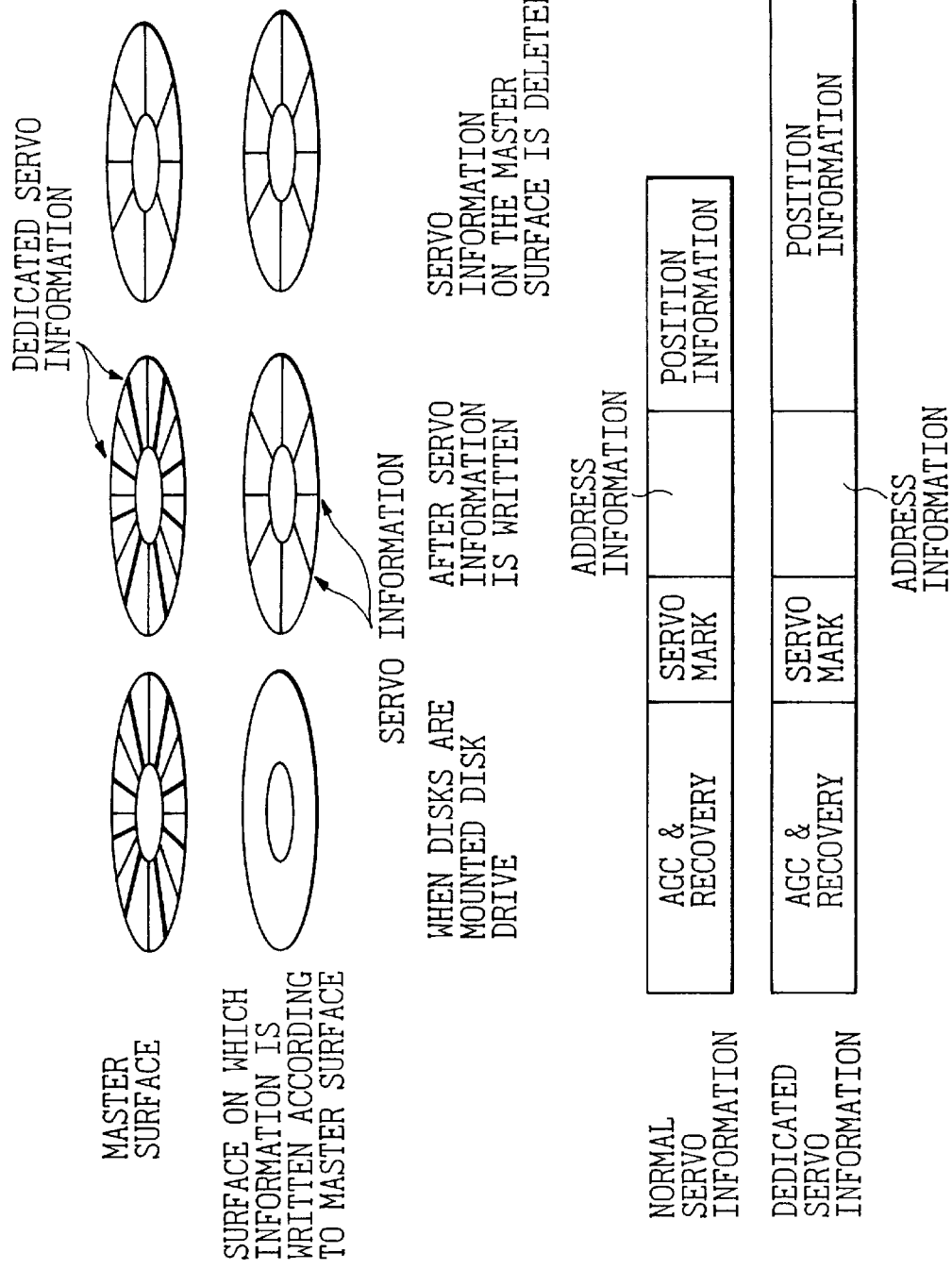

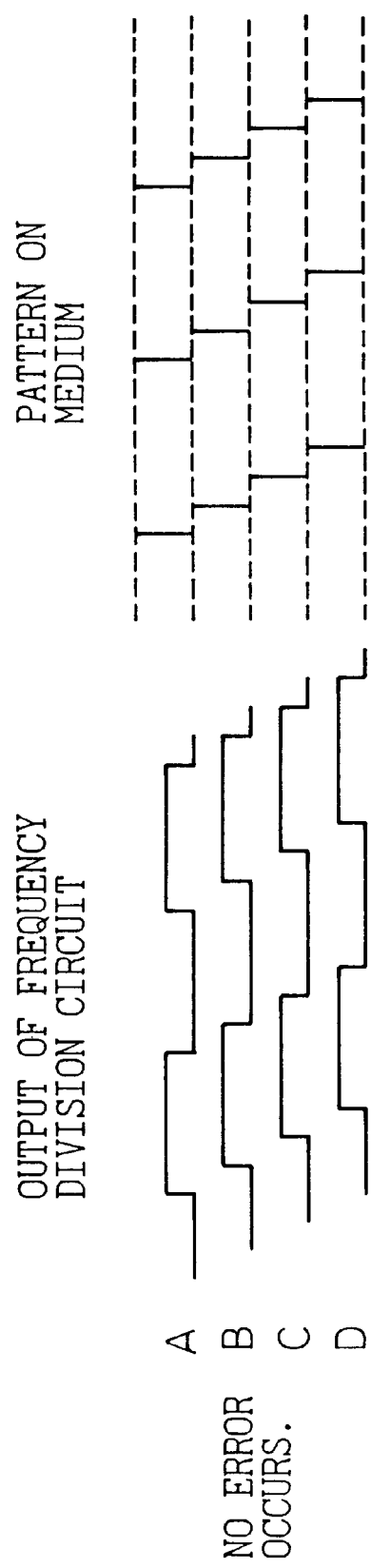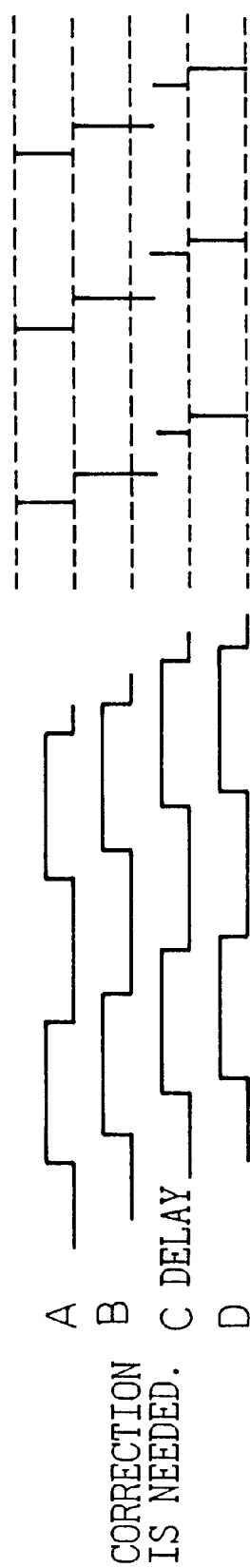

SERVO PATTERN WRITING METHOD FOR MAGNETIC DISK DRIVES, AND MAGNETIC DISK DRIVE ADOPTING THE METHOD

BACKGROUND OF THE INVENTION

1. Field of the Invention

The present invention relates to a servo pattern writing method for magnetic disk drives and to a magnetic disk drive. More particularly, the present invention is concerned with a servo pattern writing method for magnetic disk drives making it possible to readily write a high-density and easily controllable servo pattern, and a magnetic disk drive in which a servo pattern is written in this way.

2. Description of the Related Art

A magnetic disk drive (hereinafter simply a disk drive) is an apparatus that stores data by recording a magnetic pattern on a magnetic disk (hereinafter simply a disk) using a magnetic head (hereinafter simply a head), and that reads data by detecting a change in magnetic field caused by the recorded magnetic pattern. For specifying a position at which storing and reading are carried out, magnetic guides referred to as tracks are recorded on disks concentrically with the center of rotation of the disks as a center. By specifying a track, a position in a radial direction is defined. Each track is segmented in a circumferential direction into a plurality of portions referred to as sectors. Sector numbers indicating the numbers of sectors are recorded magnetically on each disk. Storing data is carried out in units of a sector. A position in the circumferential direction is defined by specifying a sector number.

In recent years, magnetic disk drives have had storage capacities thereof increased by improving the recording density in a circumferential direction and the recording density in a direction of tracks. For improving the recording density in the direction of tracks, servo information used to position a head is embedded discretely among data items on each medium for the purpose of recording. This recording method has become mainstream nowadays, and is generally termed an embedded servo method. Herein, the term is adopted. The embedded servo method makes it necessary to write all servo information on data surfaces in advance.

In a known disk drive, after disks are attached to an axis of rotation of a spindle motor 15, a servo track writer (STW) is used to write servo information on record surfaces. The servo track writer gives control so that while the position of each arm is being measured accurately by a laser measuring device, the arm is moved to a given position, and then given servo information (a servo pattern) is written. When writing a servo pattern is completed, the disk drive is dismounted from the STW, provided with a housing, and then sealed up. Thus, a complete disk drive is produced. The time required for writing a servo pattern is proportional to the number of tracks. When the number of tracks increases due to an improvement in track density, the time required for writing a servo pattern increases accordingly. Moreover, since writing a servo pattern is carried out for each surface of a disk by changing a head for applying a writing signal from one to another, if the number of disks gets larger, the total time required for writing servo patterns increases accordingly. The STW employs a laser measuring device and can therefore precisely control positioning. However, the STW is complex and expensive. Furthermore, writing a servo pattern must be carried out with the cover of a magnetic disk drive removed and with surfaces of disks exposed, and therefore must be achieved in a clean room. Thus, when the STW is used to write servo patterns, a dedicated facility and environment are needed.

As mentioned above, after a magnetic disk drive is mounted in an STW, a spindle motor in the disk drive is rotated, and a head in the disk drive is used to write servo patterns. However, the position of each arm is measured precisely by a laser measuring device and controlled to coincide with a given position. Tracks on which a servo pattern is thus written are not completely round because of vibrations of heads and disks during writing, or eccentricity or deflection of a spindle motor, but appear to vibrate relative to circular trajectories. For improving the recording density of the disk drive, it is required to reduce the spacing between tracks and thus increase the number of tracks that can be recorded on each disk. However, if tracks vibrate, adjoining tracks may interfere with each other. The spacing between tracks cannot therefore be narrowed very much. Consequently, the recording density cannot be improved. For improving the density of tracks, a servo pattern serving as a reference must be written very precisely. If the magnetic disk drive is mounted in the STW in order to write servo patterns, tracks cannot be written with sufficient precision for the aforesaid reasons.

Conceivably, an STW having a dedicated high-precision spindle motor and a dedicated actuator is prepared, and disks are attached to the STW in order to write servo patterns highly precisely, and then incorporated in a disk drive. In this way, servo patterns can be written very precisely, and eventually the density of tracks can be improved. However, since a plurality of disks are incorporated in a magnetic disk drive, if the disks have servo patterns written externally and are then incorporated, the servo pattern on each surface of disks becomes eccentric because of an error deriving from incorporation. Moreover, the magnitude and direction of eccentricity differ from surface to surface. As mentioned previously, an actuator in the magnetic disk drive is shared by disks, and heads associated with the disks are moved all together by the actuator. When a surface of disks to be accessed is changed from one to another, a head for applying or extracting a signal is changed from one to another. Consequently, if the magnitude and direction of eccentricity differ from surface to surface, there arises a problem that control to be given for changing a surface of disks to be accessed from one to another becomes complex, and the time required for access gets longer.

As described above, a dedicated facility and environment such as a clean room are required for writing a servo pattern using an STW. This poses a problem that if the work time in the clean room increases, production deteriorates. This problem becomes significant especially when the density of tracks is increased in order to improve recording density or the number of disks is increased in order to improve a storage capacity, because the work time increases accordingly.

As mentioned above, when a magnetic disk drive is mounted in an STW in order to write servo patterns, there arises a problem that the precision of the servo patterns is unsatisfactory. The method for solving this problem in which after a servo pattern is written on disks, the disks are incorporated in a disk drive has a problem that a difference in eccentricity among the incorporated disks leads to complex control and a longer time required for access.

SUMMARY OF THE INVENTION

An object of the present invention is to realize a servo pattern writing method for magnetic disk drives making it possible to write a high-density and easily-controllable servo pattern with high producibility, and a magnetic disk drive in which the method is implemented.

According to a servo pattern writing method for magnetic disk drives in accordance with the present invention, for accomplishing the above object, a master servo pattern is written precisely on a master surface that is one of a plurality of surfaces of media, and then a servo pattern is written on the other surfaces of media while controlling positioning using the master servo pattern. For realizing such a servo pattern writing method, a magnetic disk drive is required to be able to write a servo pattern precisely on any surface of media other than the master surface while carrying out positioning on the surface of media other than the master surface according to the master servo pattern. For writing the master servo pattern precisely on the master surface, an external dedicated device is used. A disk on which the master servo pattern is written is then incorporated in the disk drive. The master servo pattern includes a pattern identical to the servo patterns written on the surfaces of media other than the master surface.

According to a servo pattern writing method for magnetic disk drives in accordance with the present invention, a master servo pattern is written by a dedicated high-precision device prior to incorporation of a disk, and can therefore enjoy very high precision. Moreover, since the master servo pattern should merely be recorded on one surface, the work time required in a clean room is short. Writing a servo pattern on any other surface of media is carried out while positioning on any surface of media other than the master surface is carried out on the basis of the master servo pattern. Even if the master servo pattern on an incorporated disk is eccentric relative to the center of rotation of the disk drive, the servo patterns on the other surfaces of media have a given relationship with the master servo pattern, for example, a relationship of concentricity. In the assembled disk drive, the servo patterns on the surfaces of media have the given relationship. Changing heads can be controlled easily, and an access time can be shortened. Moreover, since writing a servo pattern on the other surfaces of media is carried out after assembly, it need not be carried out in a clean room. This leads to higher productivity.

In an embedded servo type magnetic disk drive, heads are opposed to the surfaces of media. A circuit unit for processing signals produced by the heads or generating a written signal to be applied to the heads is shared by the heads. A multiplexer is included for changing a head to be connected to the shared circuit unit from one to another. A signal produced by a connected head is used to demodulate a servo pattern for the purpose of positioning control and timing control. Meanwhile, the signal produced by the head is detected and read, or a written signal is output to the head. For writing a servo pattern on any other surface of media while controlling positioning on the basis of a master servo pattern, the same configuration can be adopted. In this case, positioning is carried out on the basis of the master servo pattern. For writing a servo pattern on any other surface of media, heads are changed, and data of the servo patterns is output to a head. When writing is completed, the head is changed to a head associated with a master surface, and positioning is carried out. This sequence is repeated. According to the configuration, however, servo patterns must be written on the other surfaces of disks on the basis of a master servo pattern when control positioning is not under way. This poses a problem that positions occupied by the master servo pattern deviate from positions occupied by a servo pattern on any other surface of disks. To avoid this problem, the servo patterns must be written on the other surfaces of disks while the master servo pattern is being read.

A movable range of an actuator is limited by stoppers. Within the movable range, the position of the actuator must be able to be controlled precisely according to a master servo pattern. If a disk having a master surface is eccentric, the master servo pattern deviates by the magnitude of eccentricity. The master servo pattern must therefore be written in a range wider than a normally required range. The number of tracks involved in a master servo pattern must therefore be larger than the number of tracks involved in a servo pattern to be written in any surface other than the master surface.

In a magnetic disk drive, an actuator is controlled so that the actuator tracks a desired track according to a servo pattern read by a head. If the servo pattern is precise, the head can trace a precise trajectory while following the servo pattern. If a master servo pattern is precise, servo patterns written on surfaces of media other than the master surface are precise. Tracks of high density can be formed.

As mentioned above, according to the data-surface servo method, data used for servo control is written discretely among data items, or more particularly, in leading areas of sectors. Data is written in the other areas thereof. The servo data is sampled at intervals of a given cycle for the purpose of servo control. For servo control, when the cycle of sampling is shorter or the period during which servo data can be acquired is longer, servo control can be attained with higher precision. From this viewpoint, the number of areas, in which servo information is written according to a master servo pattern, per circumference, should preferably be made larger than the number of such areas per circumference on any surface other than the master surface, so that a sampling cycle can be shortened. Otherwise, the length of an area on the master surface in which servo information is written should preferably be made larger so that a larger amount of servo information can be provided. Furthermore, a PLL synchronization pattern is written in areas in which information constituting a master servo pattern is not written, so that servo control can be attained more accurately. However, if no measure is taken, the amount of data that can be recorded on the master surface is limited. It is therefore required to delete part of a master servo pattern other than a pattern identical to a normally-used servo pattern, that is, servo patterns written on the other surfaces of media at the time of completion of writing a servo pattern on the other surfaces of media.

Servo patterns to be written on other surfaces of media may be different in format from a master servo pattern. For example, the servo patterns on the surfaces of media other than a master surface may be written to occupy positions deviated in a direction of rotation from the positions occupied by the master servo pattern.

Furthermore, when a servo pattern is written on surfaces of media other than a master surface, the phase of a signal representing each servo pattern may be shifted by a value indicated with a positional error signal produced by reading the master servo pattern or by a designated value, so that a positional error can be corrected during reading.

Furthermore, instead of deleting part of a master servo pattern other than a pattern identical to a normally-used servo pattern, the part of the master servo pattern may be rewritten to be a new pattern. For example, in consideration of the eccentricity of a disk having a master surface, patterns equivalent to the master servo pattern are written on other surfaces, and the aforesaid processing is carried out with the new pattern used as a master servo pattern. Consequently, concentric servo patterns free from eccentricity can be written on all the surfaces of media. This results in simple tracking control.

BRIEF DESCRIPTION OF THE DRAWINGS

The present invention will be more clearly understood from the description as set below with reference being made to the accompanying drawings, wherein:

FIG. 3 is a flowchart describing servo pattern writing using the known STW;

FIG. 12 lists data items for explaining the effect of an increase in sampling rate in the second embodiment of the present invention;

FIGS. 13A and 13B are diagrams showing a servo pattern on a master surface and a servo pattern written on any other surface in the third embodiment of the present invention, FIG. 13A illustrates the servo patterns, and FIG. 13B illustrates servo information;

FIG. 14A illustrates variations of signal components stemming from the modified servo pattern, and FIG. 14B is a block diagram of a processing circuit;

FIGS. 19A and 19B show outputs of a phase adjustment circuit in the fourth embodiment and a pattern written on a medium, FIG. 19A shows the outputs and pattern unaffected by an error, and FIG. 19B shows the outputs and pattern to be corrected.

DESCRIPTION OF THE PREFERRED EMBODIMENTS

Before proceeding to a detailed description of the preferred embodiments of the present invention, prior art disk drives will be described with reference being made to the accompanying drawings relating thereto for a clearer understanding of the difference between the prior art and the present invention.

Figure 1:
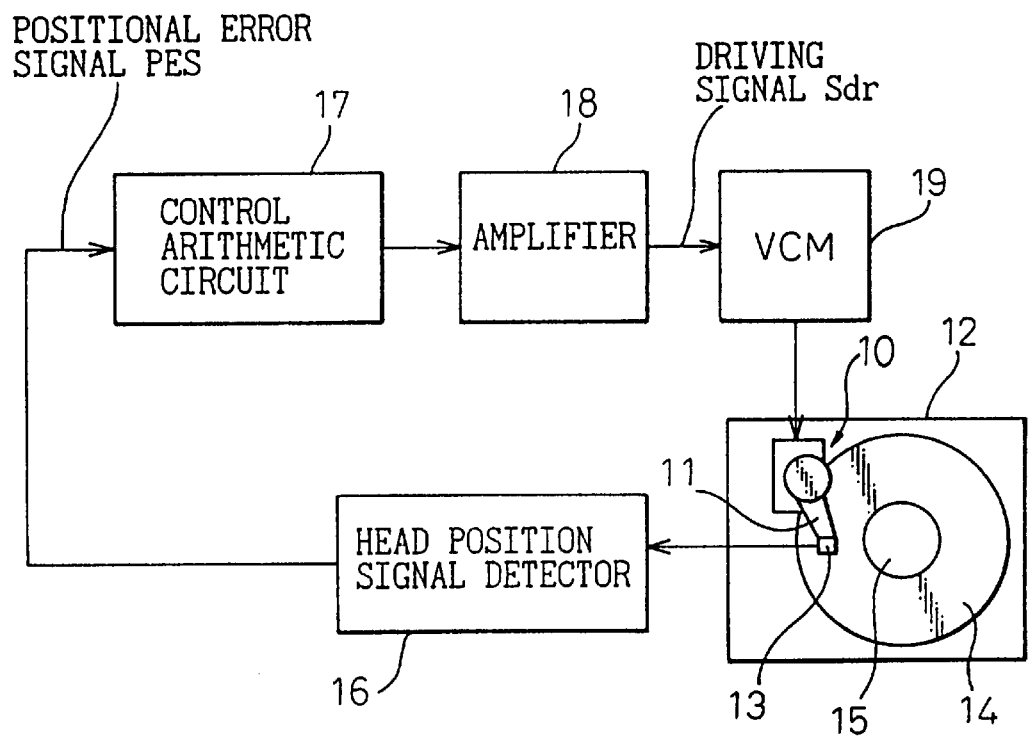
FIG. 1 is a control block diagram showing the configuration of a known head positioning control unit.

FIG. 1 is a control block diagram showing the configuration of a head positioning control unit in a known disk drive.

As shown in FIG. 1, the disk drive is designed so that disks 14 (normally, a plurality of disks which may mean surfaces of disks) attached to an axis of rotation of a spindle motor 15 rotate within a main unit 12. When the disks 14 rotate, heads 13 fly at a microscopic height due to air pressure. The heads 13 are held at the tips of arms 11 that rotate freely. When the arms 11 are rotated, the position of the heads 13 in a radial direction on the disks 14 can be changed from one to another. Recording data is carried out along tracks on the surface of any of the disks 14 which are concentric with the center of rotation as a center. Writing or reading data is carried out when a target sector rotates to come to the position of an associated head 13 with the head 13 controlled to be located on a target track by an actuator 10.

Tracks are recorded magnetically. The heads 13 read magnetic data indicating tracks. Tracking is carried out so that any of the heads 13 can be controlled to be located on a target track. Signals indicating sectors are magnetically recorded on the disks 14. The head 13 reads magnetic data concerning a sector and thus identifies the sector.

According to an embedded servo method, servo information is recorded in leading areas of sectors. A head position signal detector 16 extracts servo information from a signal detected by a head 13, produces a signal proportional to an error of the position of the head 13 from the position of a track, and inputs a signal of opposite polarity to a control arithmetic circuit 17. The control arithmetic circuit 17 produces a signal used to correct the error, and inputs it as a driving signal Sdr to a voice coil motor 19 via an amplifier 18. In response to the signal, the voice coil motor 19 moves the head 13 so that the head 13 is located in the center of the track. Thus, the head 13 is controlled by feeding back the position thereof so that the head 13 is located on a target track. FIG. 1 shows a control block alone causing a head 13 to lie on a track. Moreover, control is given so that a track number is identified from servo information, and the arms 11 are turned on the basis of the track number in order to change tracks, or processing is carried out for identifying a sector number from servo information. The description of the control and processing will be omitted herein.

Figure 2:
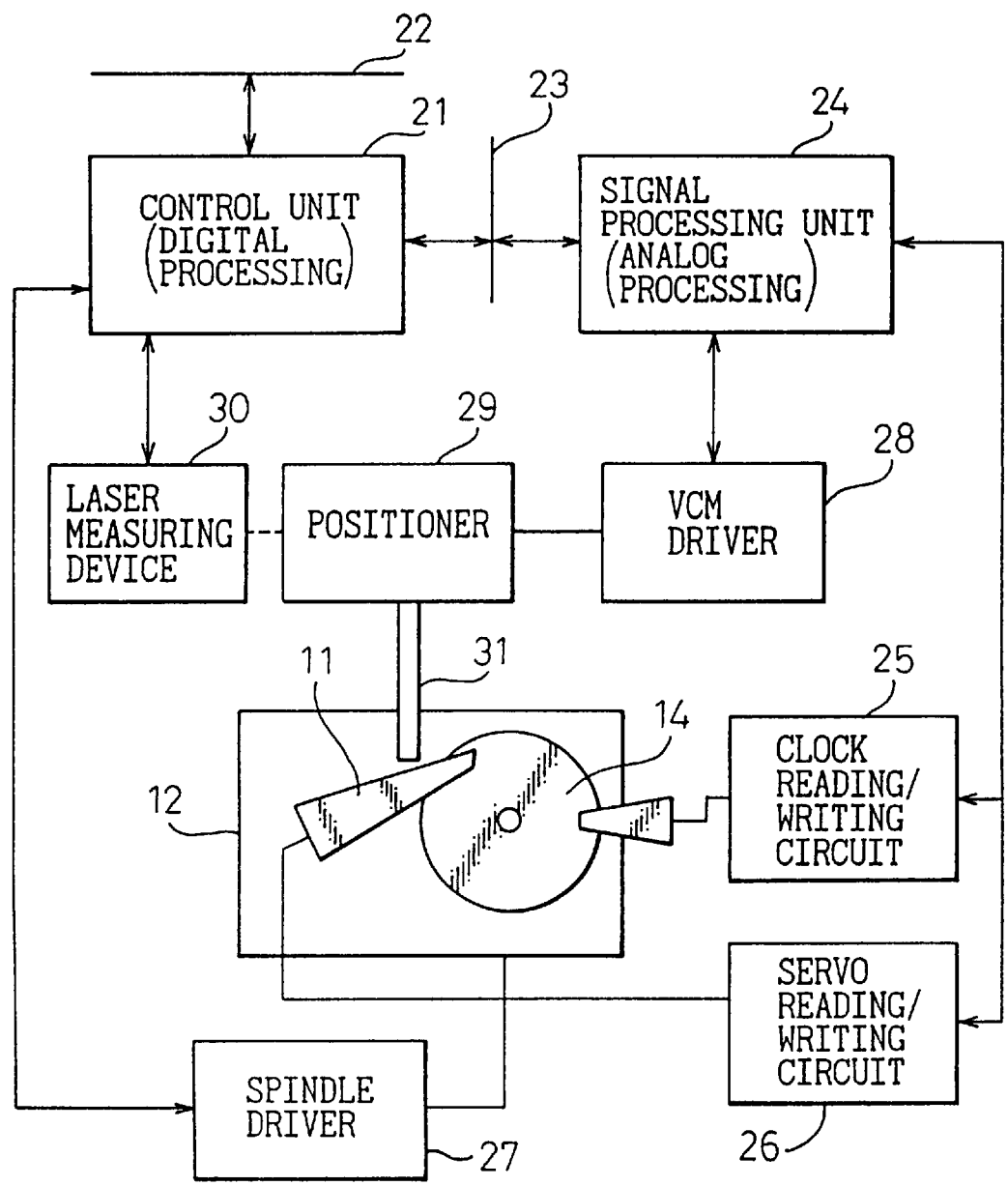
FIG. 2 is a diagram showing the outline configuration of a known STW.

In a known disk drive, after disks are attached to an axis of rotation of a spindle motor 15, a servo track writer (STW) is used to write servo information on record surfaces. FIG. 2 is a diagram showing the outline configuration of a known STW. In FIG. 2, there are shown a disk drive 12 in which servo information is about to be written, a control unit 21 responsible for digital processing, a system bus 22 used to provide interface with other components of the STW, a signal processing unit 24 for processing an analog signal, a local bus 23 for interfacing between the control unit 21 and signal processing unit 24, a clock reading/writing circuit 25 for writing a clock on surfaces of disks and reading a written clock, a servo reading/writing circuit 26 for writing servo information on the surfaces of disks and reading written servo information, a spindle driver 27 for driving the spindle motor of the disk drive, a positioner 29, a VCM driver 28 for driving the positioner 29, a laser measuring device 30 for measuring precisely a position to which the positioner 29 has moved, and a positioning bar 31 pressing the arms of the disk drive and being moved by the positioner 29.

FIG. 3 is a flowchart describing an example of known processing for writing servo information (servo pattern) using an STW. First, at step 501, the heads and media (disks) are incorporated in a main unit (disk enclosure (DE)) of the disk drive. At step 502, the magnetic disk drive 12 is placed on a stage as shown in FIG. 2, and set so that data can be written. At step 503, control is given so that the positioning bar 31, that is, the arms 11 are moved to a given position while the position of the positioning bar 31, that is, the arms 11 are measured precisely by the laser measuring device 30. Given servo information (servo pattern) is then written on the basis of a signal generated by the signal processing unit 24. The servo pattern is written on each surface of disks. When writing a servo pattern on all the surfaces of disks (by the STW) is completed, the main unit 12 of the disk drive is dismounted from the STW at step 504. A housing is attached to the disk drive at step 505, whereby a complete disk drive is produced. The complete disk drive is tested at step 506. Disk drives that have passed the test are delivered as products. The time required for writing a servo pattern increases according to the number of tracks and the number of disks. The STW is complex and expensive, and the foregoing work must be carried out in a clean room. Tracks involved in a servo pattern written by the STW are not completely round because of vibrations of heads and disks occurring during writing, or eccentricity or deflection of the spindle motor, but appear to vibrate relative to circular trajectories. A spacing between tracks cannot therefore be reduced very much. Consequently, recording density cannot be improved.

A conceivable method is such that: an STW including a dedicated high-precision spindle motor and a dedicated actuator is prepared; disks are mounted in the STW; a servo pattern is written on each of the disks highly precisely; and the disks are mounted in the disk drive. According to the method, a servo pattern can be written with very high precision, and the density of tracks can be improved. However, since a plurality of disks are incorporated in the magnetic disk drive, if the disks are incorporated after having servo patterns written thereon externally, the servo patterns on the surfaces of the disks become eccentric because of an error deriving from the incorporation. Moreover, the magnitude and direction of eccentricity differ from surface to surface. As mentioned above, an actuator in a magnetic disk drive is shared by disks and heads associated with the disks are moved together by the actuator. For changing a disk surface to be accessed from one to another, a signal is applied or a head by which a signal is acquired is changed from one to another. Consequently, there arises a problem that if the magnitude and direction of eccentricity differs from surface to surface, control to be given to change a surface of disks to be accessed from one to another becomes complex and the time required for access gets longer.

According to the present invention, the problem can be solved.

Figure 4A:
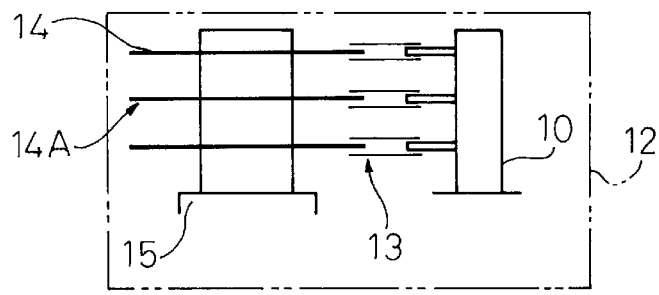
FIGS. 4A to 4C are diagrams showing the basic configuration of a disk drive of the present invention.
Figure 4B:
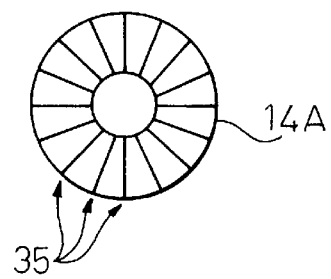
Figure 4C:
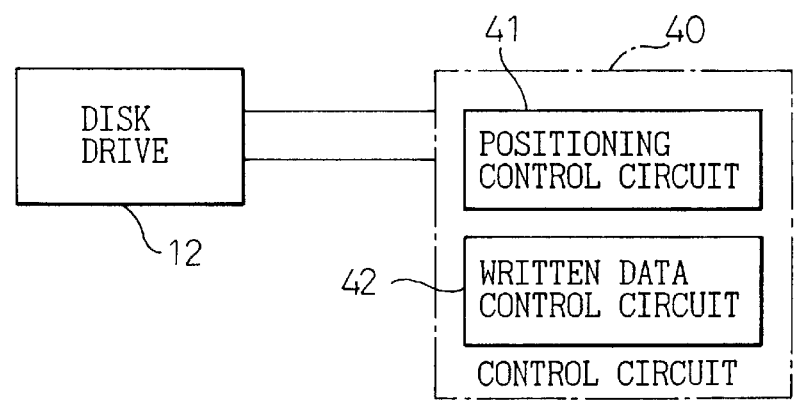

FIGS. 4A to 4C are diagrams showing the basic configuration of a magnetic disk drive of the present invention. FIG. 4A shows the overall configuration of the disk drive, FIG. 4B shows a servo pattern on a master surface, and FIG. 4C shows the configuration of a control unit.

A servo pattern writing method for magnetic disk drives according to the present invention is a servo pattern writing method for magnetic disk drives in which a servo pattern is written on a plurality of surfaces of the disks in a magnetic disk drive. The servo pattern writing method comprises a step of writing a master servo pattern on a master surface that is one of the plurality of surfaces of the disks, and a step of writing a servo pattern on the surfaces of the disks other than the master surface while positioning is carried out on the basis of the master servo pattern. The master servo pattern contains a pattern identical to the servo pattern to be written on the surfaces of the disks other than the master surface.

The magnetic disk drive of the present invention is a magnetic disk drive having a plurality of surfaces of disks 14. One of the plurality of surfaces of the disks is a master surface 14A on which a master servo pattern containing a pattern identical to a servo pattern is written and recorded using an external unit. The magnetic disk drive comprises a positioning control unit 41 for carrying out positioning on the surfaces other than the master surface 14A on the basis of the master servo pattern, and a written data control circuit 42 for writing a servo pattern on the surfaces other than the master surface while a positioning means performs positioning.

According to the servo pattern writing method for magnetic disk drives in accordance with the present invention, a master servo pattern is written by a dedicated high-precision unit before a disk is incorporated. The master servo pattern can therefore enjoy very high precision. Moreover, since the master servo pattern should merely be recorded on one surface, the work time required in a clean room is short. Writing a servo pattern on the other surfaces is carried out while positioning is performed on any surface other than the master surface according to the master servo pattern. Even if the master servo pattern on the incorporated disk is eccentric relative to the center of rotation of the disk drive, the servo patterns on the other surfaces have a given relationship with the master servo pattern, for example, a relationship of concentricity. In the assembled disk drive, the servo patterns on the surfaces have the given relationship. Control to be given for changing heads is therefore simple, and an access time can be shortened. Moreover, writing a servo pattern on the other surfaces is carried out after assembling and therefore need not be carried out in the clean room. This results in high producibility.

Figure 5:
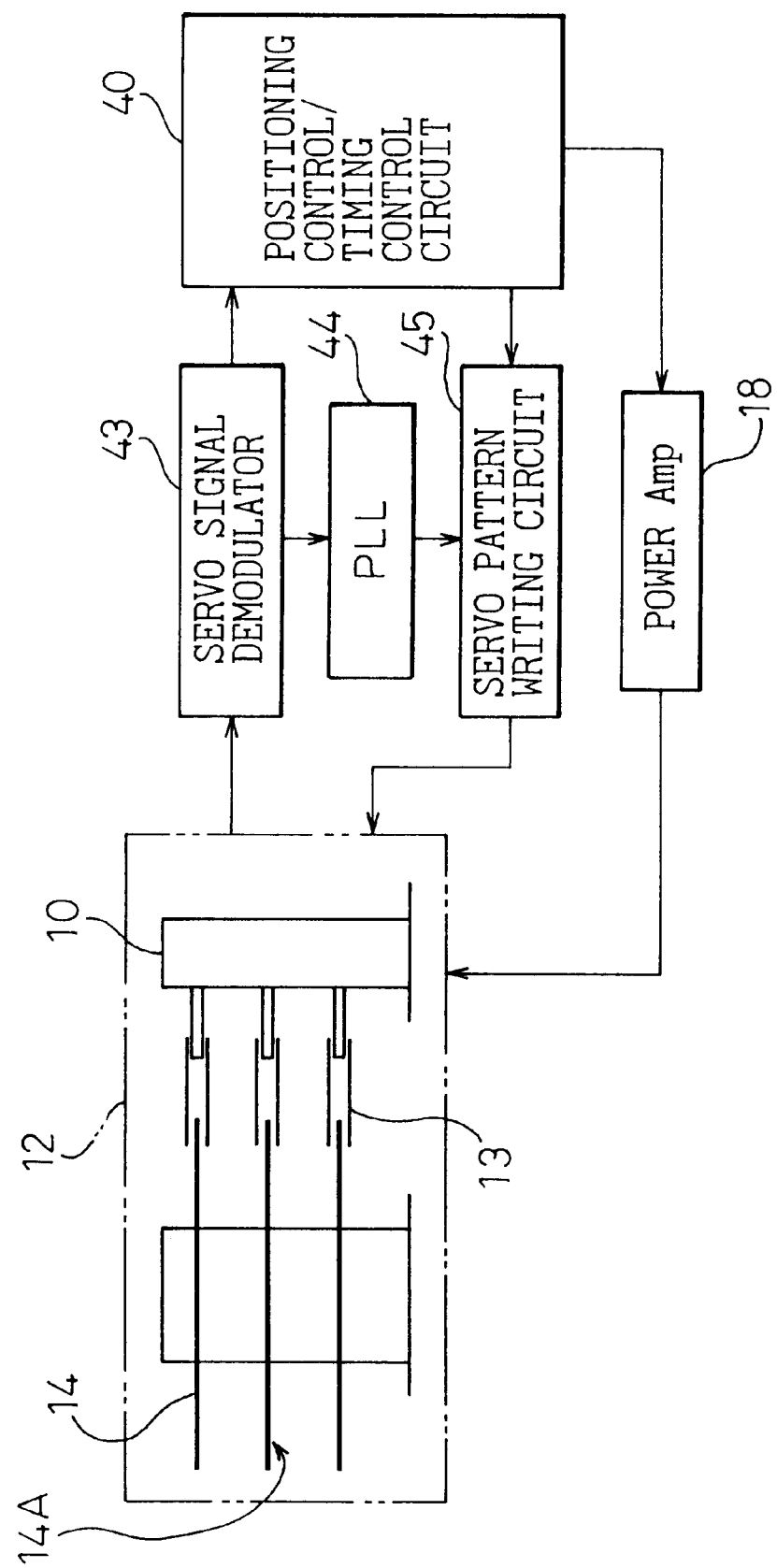
FIG. 5 is a block diagram showing the configuration of a disk drive of an embodiment of the present invention.

FIG. 5 is a diagram showing the configuration of a magnetic disk drive which is adopted in common among embodiments of the present invention. The configuration is identical to that of a known disk drive except that a control circuit 43 produces written data needed to write a servo pattern. The spindle motor 15 has three disks 14. There is six surfaces of disks. The number of heads 13 is therefore six. One of the six surfaces of disks is a master surface 14A. The positions on the surfaces of disks of the heads 13 can be changed by the actuator 10. Detection of a read signal produced by a head 13 and application of a written signal to a head 13 is carried out over a signal line in the actuator 10. Signal lines linked to the six heads 13 are linked to a multiplexer that is not shown. Any of the heads is connected to circuits succeeding the multiplexer. An output of the multiplexer is input to a servo signal demodulator 43. A servo signal demodulated by the servo signal demodulator 43 is passed to a control circuit 40 and output to a PLL 44. The PLL 44 produces a signal synchronous with the demodulated servo signal. The control circuit 40 judges the position of a track or sector from the demodulated servo signal, and outputs a signal for use in controlling the actuator 10 via the power amplifier 18 so that access is gained to a desired track. For reading, when a desired sector comes along, data is extracted from an output signal of the servo signal demodulator 43. For writing, external written data is output to a written signal generator 45. The signal generator 45 produces and outputs a signal proportional to the written data while matching the timing with the timing of a signal sent from the PLL 44. Depending on a head to be connected by the multiplexer, any surface of disks to be accessed is selected.

Figure 6:
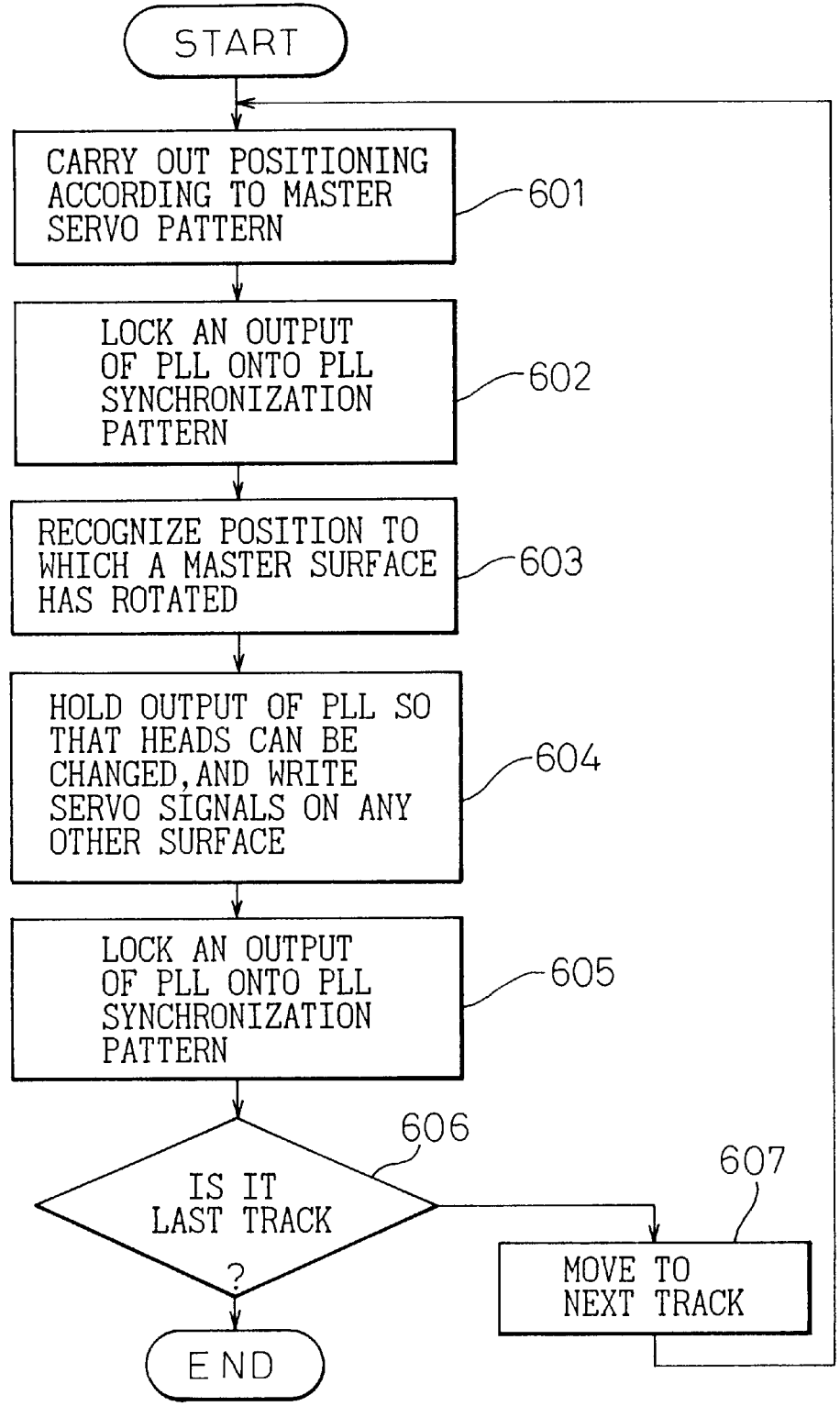
FIG. 6 is a flowchart describing servo pattern writing in the disk drive of the embodiment of the present invention.
Figure 7:
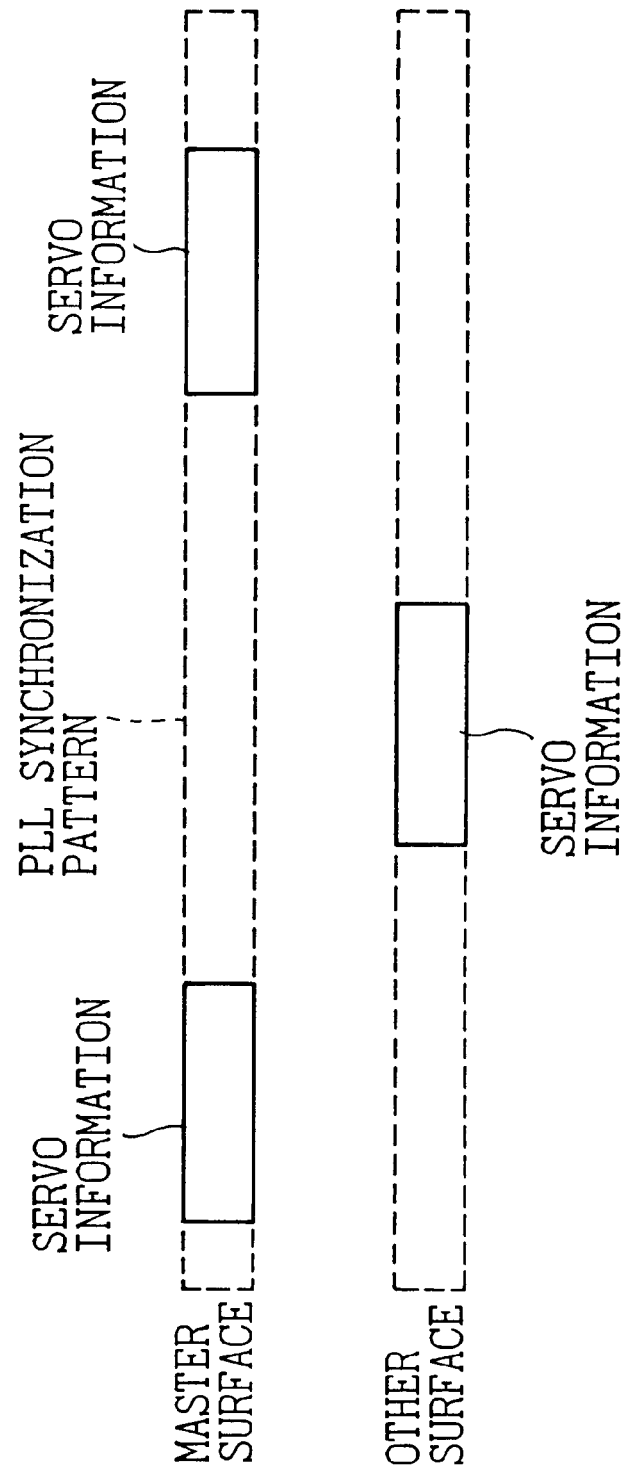
FIG. 7 is a diagram showing positions at which servo information is written in the first embodiment.

FIG. 6 is a flowchart describing processing for, in the first embodiment, writing a servo pattern on the surfaces of disks other than the master surface 14A while positioning is controlled according to the master servo pattern. FIG. 7 is a diagram showing the relationship between positions occupied by the master servo pattern and a servo pattern respectively according to the first embodiment. In the first embodiment, the master servo pattern itself is the same as a final servo pattern. A PLL synchronization pattern is written in an area among areas in which servo information (servo data) is written. Referring to FIG. 6, writing a servo pattern in accordance with the first embodiment will be described.

At step 601, the multiplexer is switched so that the master servo pattern is read from the master surface. Positioning is then controlled on the basis of the read signal of the master servo pattern. At step 602, the PLL 44 locks an output thereof onto a PLL pattern. When such control is stabilized, a position to which the master surface has rotated is recognized. When an area immediately preceding a position, at which a servo pattern is written on any other surface of disks, comes along, the PLL holds its output at step 604 so that heads can be changed. A servo pattern is then written on the surface of the disks. When writing is completed, the multiplexer is switched at step 605 so that the master servo pattern on the master surface can be read. The PLL locks its output onto the input thereof. At step 606, it is judged if the servo pattern has been written on all tracks on all the surfaces of disks. If the servo pattern has not been written on any track, the multiplexer is switched at step 607 so that the servo pattern can be written on the next track. Control is then returned to step 601. The above processing is repeated until the servo pattern has been written on all the tracks on all the surfaces of disks.

As mentioned above, in the first embodiment, after the master servo pattern is read, positioning is controlled. A PLL synchronization pattern written intermediately of the master servo pattern is read, and the output of the PLL is locked onto the PLL synchronization pattern. Thereafter, heads are changed, and a servo pattern is written on any other surface. The positional relationship between the master servo pattern and servo pattern is, as shown in FIG. 7, a relationship of deviation in a circumferential direction.

Figure 8:
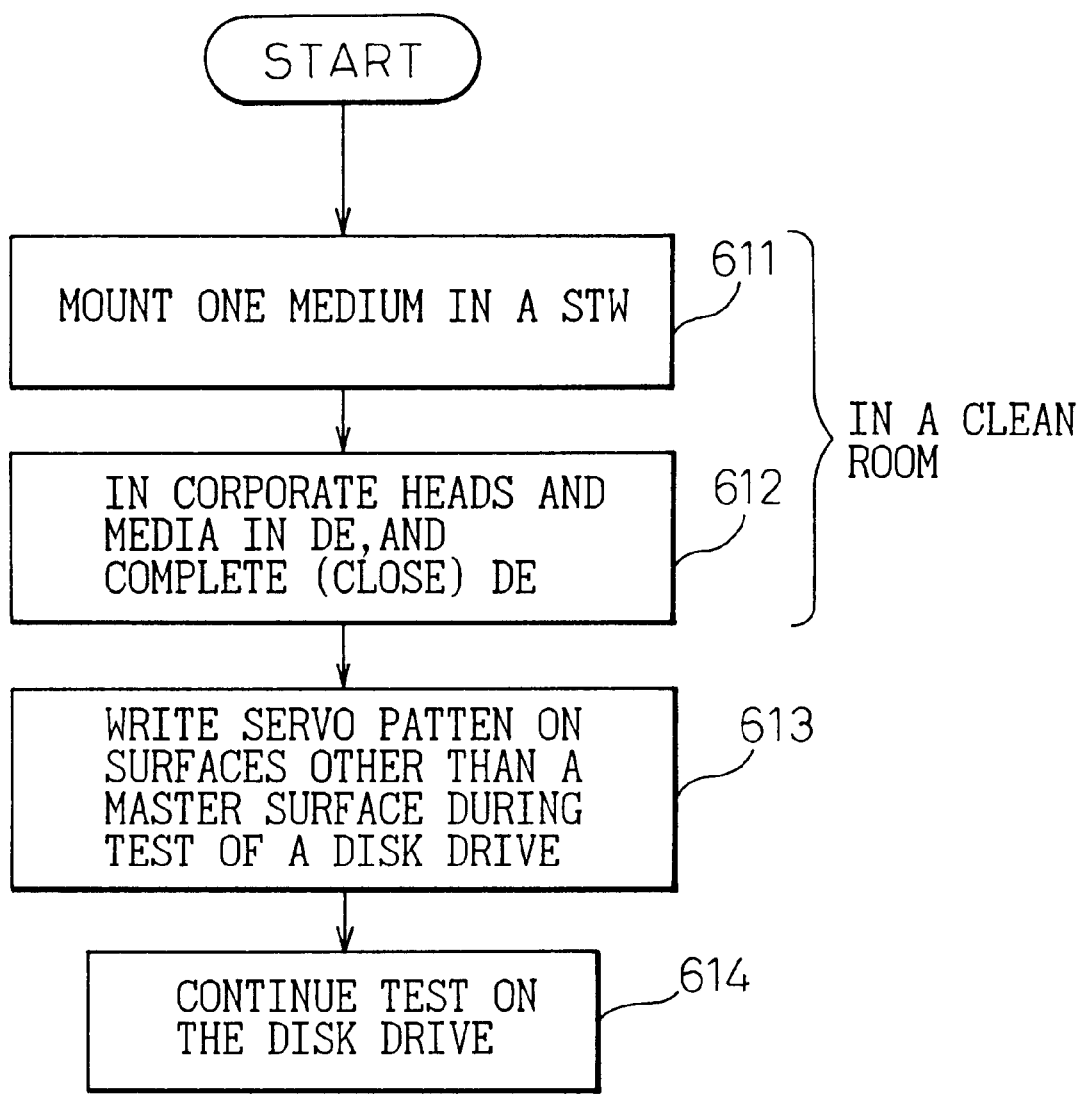
FIG. 8 is a flowchart describing servo pattern writing in accordance with the present invention.

Next, manufacturing processes for constructing the magnetic disk drive of the first embodiment will be described. FIG. 8 is a diagram describing assembling processes for constructing the magnetic disk drive of the first embodiment.

At step 611, within a clean room, only a disk having a master surface is mounted in an STW capable of writing a high-precision servo pattern and provided with a dedicated spindle motor and actuator. A master servo pattern is then written on the master surface. At step 612, the disk having the master surface is incorporated in the main unit of the magnetic disk drive and sealed up. A complete magnetic disk drive is thus produced. The work ending with this step is the work to be performed in the clean room. The subsequent work is performed outside the clean room. At step 613, the disk drive is tested. At this time, a servo pattern is written on the other surfaces of disks while positioning is controlled on the basis of the master servo pattern. At step 614, the test on the disk drive is continued.

In the first embodiment, the master servo pattern is identical to a final servo pattern. Alternatively, the master servo pattern may be a different pattern. In this case, positioning can be controlled more accurately when a servo pattern is written on any other surface of disks. Such an embodiment will be described below.

Figure 9:
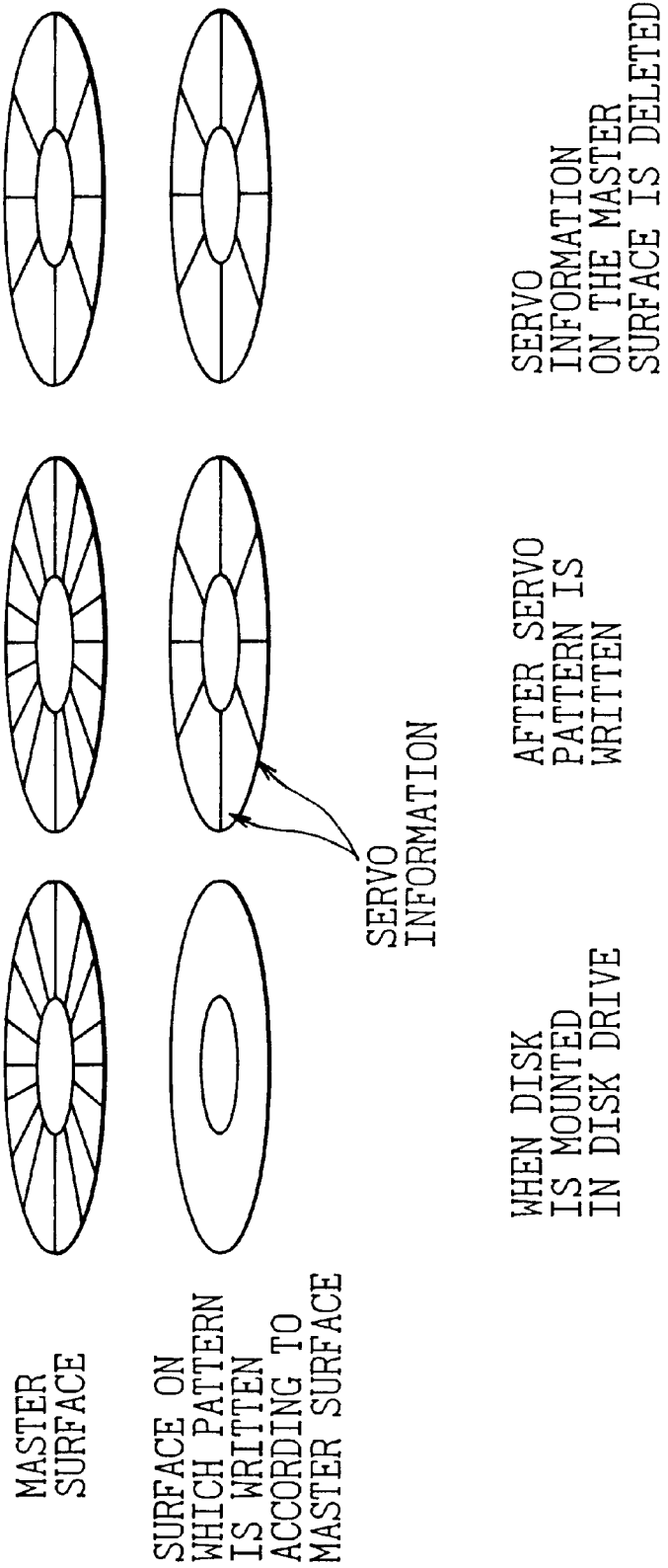
FIG. 9 is a diagram showing a servo pattern on a master surface and a servo pattern written in any other surface in the second embodiment of the present invention.

FIG. 9 is a diagram showing a master servo pattern and a servo pattern to be recorded on the other surfaces of disks in the second embodiment. As mentioned above, the servo pattern is recorded discretely in the leading areas of sectors. In other words, a spacing at intervals at which servo patterns appear is equal to the cycle of a sector. In the second embodiment, as shown in FIG. 9, a master servo pattern is recorded on a master surface so that the master servo pattern appears at intervals of a half of the spacing. In other words, the master servo pattern is written to occupy twice as many positions as those occupied by the servo pattern. Positioning is controlled by reading such a master servo pattern. The master servo pattern is read at every other position, whereby positioning is controlled and the output of the PLL is locked. A servo pattern is written to occupy positions on any other surface of of the disks, each of which coincides with every other position of the positions occupied by the master servo pattern. The positions occupied by the thus written servo pattern coincide with alternate ones of the positions occupied by the master servo pattern. According to the master servo pattern, a servo pattern is written in an area supposed to be used to store data. This causes a problem in that the storage capacity of the master surface decreases. Moreover, control becomes complex. After writing a servo pattern on the other surfaces of disks is completed, part of the master servo pattern that does not correspond to the servo pattern on any other surface of disks is deleted. This results in the final master servo pattern illustrated.

Figure 10:
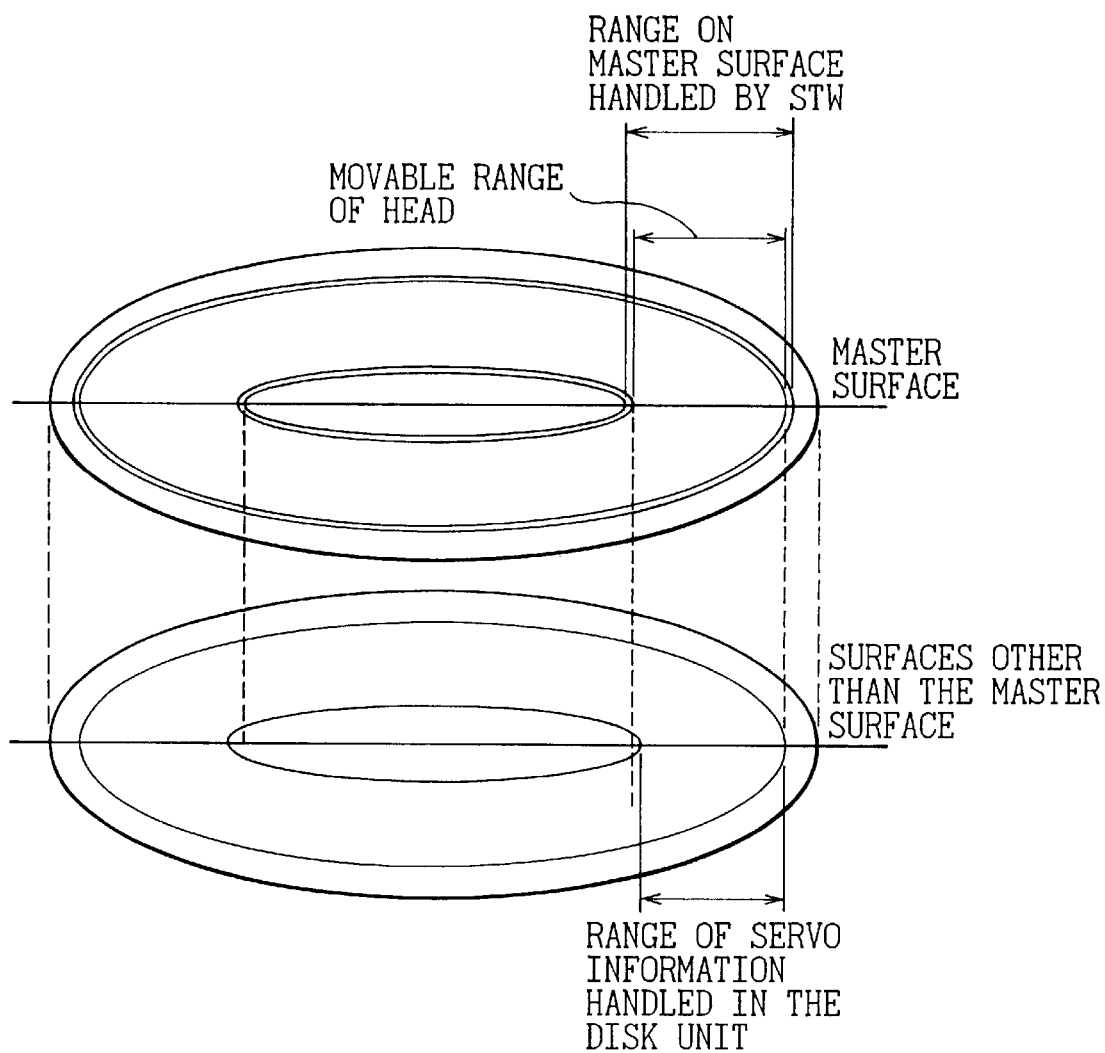
FIG. 10 is a diagram showing ranges on a master surface and any other surface within which a servo pattern is written in accordance with the present invention.

FIG. 10 is a diagram showing a difference in range in which a servo pattern is written between a master surface and any other surface. In general, the movable range of an actuator is limited by stoppers. When a servo pattern is written on any other surface of the disks according to a master servo pattern, the servo pattern cannot be written in an area of the surface beyond the movable range. When a disk having a master surface is mounted, the eccentricity of the disk cannot be made null. The master servo pattern is therefore displaced by the magnitude of eccentricity. If the master servo pattern is written within a range coincident with the movable range of the actuator, an area within the movable range in which positioning cannot be controlled is created in proportion to the magnitude of the displacement. Since a servo pattern cannot be written in the area, the area becomes unusable. The storage capacity of the disk decreases accordingly. For preventing this kind of problem, a master servo pattern must be written in a area wider than the movable range. The number of tracks involved in a master servo pattern is therefore larger than the number of tracks involved in a servo pattern to be written in any surface other than the master surface. Part of a master servo pattern written in an area outside the movable range of the actuator cannot be deleted and is therefore left intact.

Using the master servo pattern shown in FIG. 9, the positions occupied by final servo patterns on surfaces of disks are made the same in a circumferential direction.

It is generally known that the larger sampling rate of servo information leads to a more stable control system. If the master servo pattern shown in FIG. 9 is read continuously, a servo control system becomes more stable, and positioning can be controlled more accurately. Using the master servo pattern shown in FIG. 9, a servo pattern to be written on the other surfaces of the disks may be written to occupy intermediate positions of the positions occupied by the master servo pattern, and positioning may be controlled by reading the whole master servo pattern. In this way, although a servo pattern on any other surface of the disks is deviated by a quarter spacing from a servo patter on a master surface, positioning can be controlled more accurately.

Figure 11:
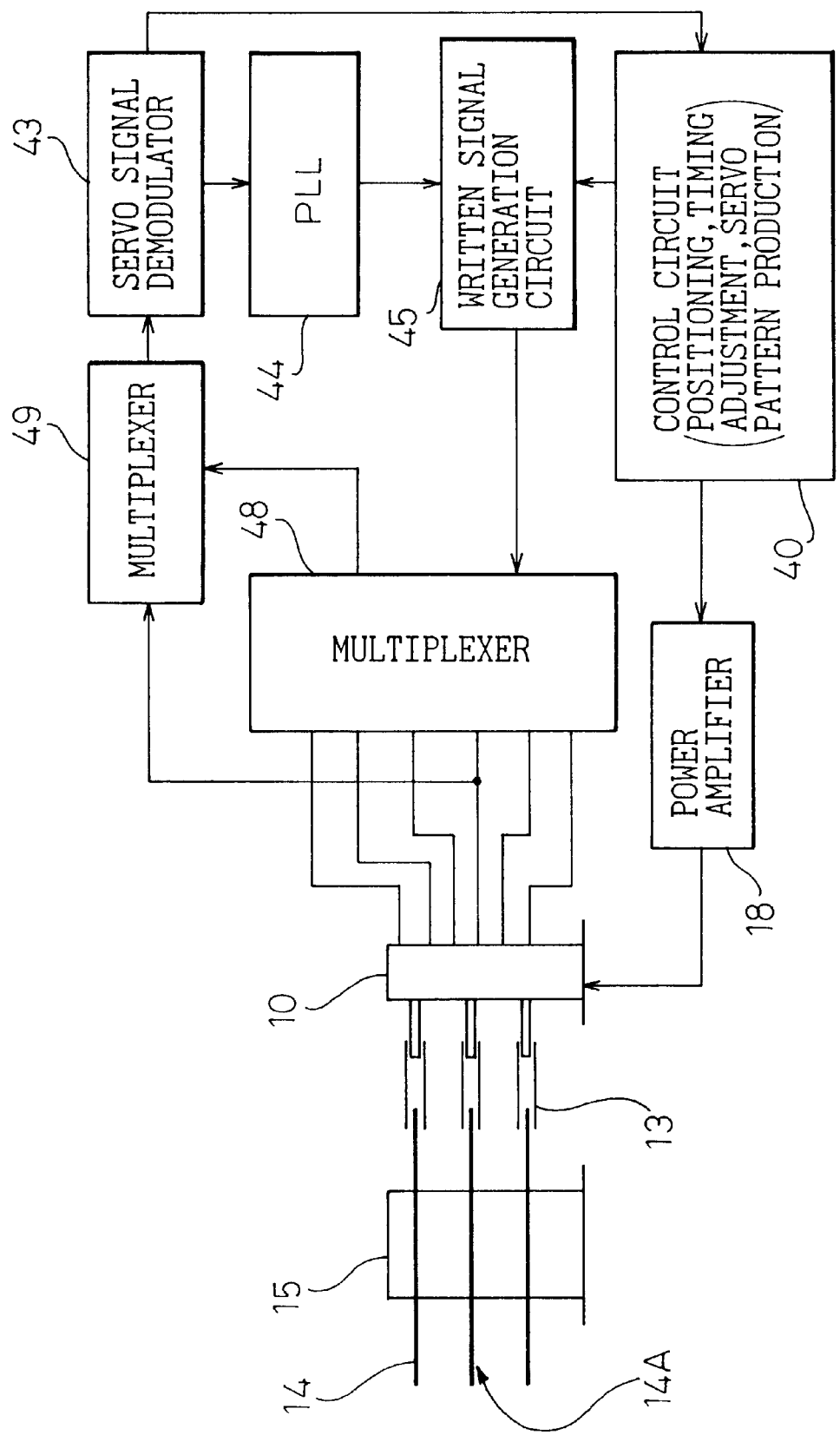
FIG. 11 is a block diagram showing another configuration of a disk drive of an embodiment of the present invention.

When the known configuration shown in FIG. 5 is used as it is, only one head is connected to the processing circuit. It is impossible that while a certain head is reading a servo pattern, another head carries out writing. FIG. 11 shows a variant enabling this kind of concurrence.

A magnetic disk drive shown in FIG. 11 is different from the one shown in FIG. 5 in a point that a multiplexer 49 is included for selecting an output signal of a multiplexer 48 that is not shown in FIG. 5 and an output of a head associated with a master surface 14A, and outputting them to a servo signal demodulator 43. For normal operations, the multiplexer 49 outputs an output signal of the multiplexer 48 to the servo signal demodulator 43. When a master servo pattern is read in order to control positioning and to write a servo pattern on any other surface of disks, the multiplexer 49 selects a signal produced by the head associated with the master surface so that the signal is output to the servo signal demodulator 43. Consequently, reading the master servo pattern and writing the servo pattern on any other surface of disks can be carried out concurrently. This obviates the necessity of changing heads which is carried out as described in FIG. 6 in the first embodiment. During writing of a servo pattern, a head is always controlled with a read signal concerning a master servo pattern. This results in higher-precision control of positioning.

Now, the relationship between a sampling rate of servo information and precision in positioning will be described. The sampling rate f of servo information by a magnetic disk drive is determined by the expression below.

$$f = N*R/60$$

where N denotes servo information per cycle, and R denotes the number of rotations (rpm) made by a disk. For example, assuming that the R value is 7200 rpm and the N value is 80, the sampling rate of servo information is 9.6 kHz.

FIG. 12 lists data items indicating the effect of an increase in the number of times of sampling, wherein assuming that a tolerance of a phase needed for ensuring stability is 40°, the values of gain-crossover frequencies in an open-loop system relative to the sampling rates of 9.6 kHz and 19.2 kHz respectively are listed. In the second embodiment, the number of positions at which a master servo pattern is written is doubled. When the sampling rate is set to 19.2 kHz, the gain-crossover frequency can be improved by about 30%. Aside from the double number of positions at which a master servo pattern is written, the number of positions may be tripled or quadrupled. The triple or quadruple number of positions leads to further improved stability in servo control.

FIGS. 13A and 13B are diagrams showing a master servo pattern and a servo pattern to be recorded on any other surface of disks in the third embodiment. FIG. 13A is a diagram showing transitions in the states of the servo patterns on a master surface and any other surface of disks. FIG. 13B is a diagram showing the contents, structures, and lengths of servo information constituting a master servo pattern and of servo information constituting a servo pattern to be recorded on any other surface of disks. As is apparent from comparison with FIG. 9, a difference from the master servo pattern in the second embodiment lies in a point that servo information of a normal length is written as part of a master servo pattern which is used as a final servo pattern, and dedicated long servo information of a higher frequency is written as the remaining part thereof which is deleted after a servo pattern is recorded on the other surfaces of disks. In the drawing, the dedicated servo information is indicated with a bold line. The servo information of a normal length is written on the other surfaces of disks. As shown in FIG. 13B, the length of a position information division of the dedicated servo information is longer than that of a position information division of the normal servo information.

In an attempt to recognize the position of a track, according to an area demodulation method or a method such as a phase demodulation method in which the integral of a plurality of servo signals are employed, a larger number of servo signals, that is, more servo information, leads to less influence of noise. A wider area in which servo information is written leads to better control. However, according to the data-surface servo method, if the area in which servo information is made wider, an area in which data is stored becomes narrower. This results in a reduced storage capacity. The servo information cannot therefore be made so long. The width of the area in which servo information is written, and the storage capacity have the relationship of a trade-off. In the third embodiment, part of a master servo pattern which is deleted after a servo pattern is written on the other surfaces of disks is formed with longer information. The part of the master servo pattern is indicated with bold lines. When a servo pattern is written on any other surface of disks, if the dedicated long servo information of a high frequency may be used to control positioning, positioning can be controlled more accurately.

Figure 14A:
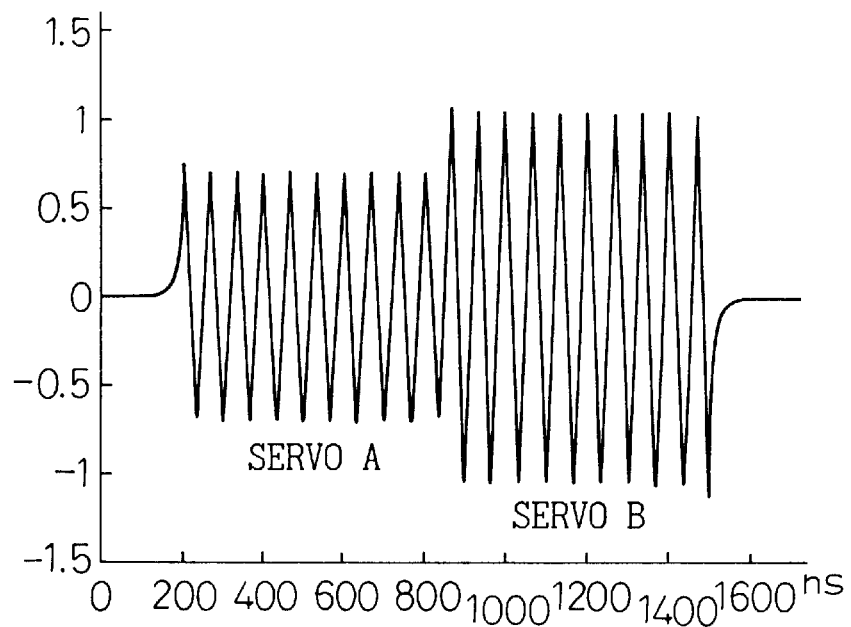
FIGS. 14A and 14B are diagrams illustrating the effect of an improvement in positioning precision due to a modified servo pattern employed in the third embodiment of the present invention.
Figure 14B:
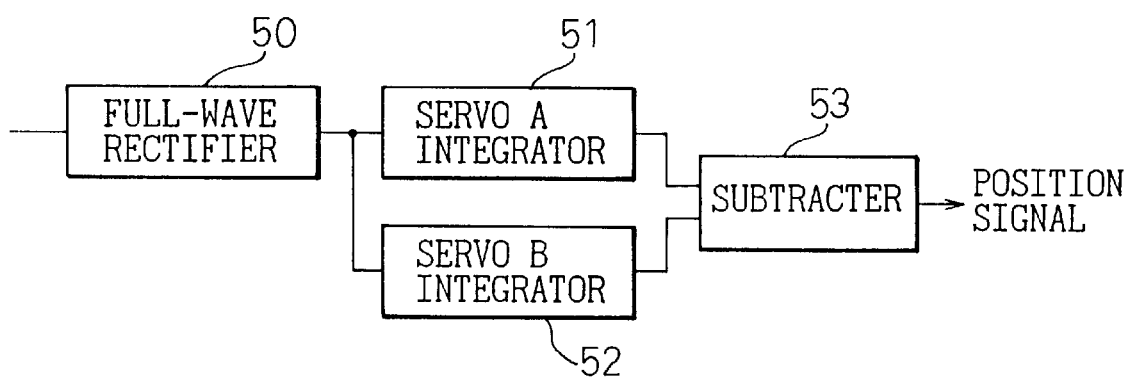

FIGS. 14A and 14B are diagrams for explaining an improvement of precision in positioning attained when a servo pattern is formed with longer information in order to increase the length of a position information division according to the area demodulation method. FIG. 14A shows an example of signal components acquired from part of a pattern formed with the position information division, and FIG. 14B is a block diagram showing the configuration of a demodulation circuit employed according to the area demodulation method. Servo A and B signal components shown in FIG. 14A are acquired by reading position information in a servo pattern. The waves of the signal components are subjected to full-wave rectification by a full-wave rectifier 50. The outputs of the full-wave rectifier 50 are integrated separately by a servo A integrator 51 and servo B integrator 52. A difference between the voltages of outputs of the integrators is calculated by a subtracter 53, whereby a position signal is produced. At this time, if the number of positions occupied by a servo pattern is larger, the influence of random noises placed on a wave can be minimized. In other words, by increasing the number of positions occupied by a servo pattern, that is, by increasing the length of servo information, the influence of noise can be minimized and the precision in positioning can be improved.

As described in conjunction with the embodiments, according to the present invention, since positioning is controlled according to a master servo pattern, precision in positioning can be improved. Consequently, a high-precision servo pattern can be written on any other disk surface. The servo pattern to be written on any other disk surface is identical to part of a master servo pattern. Alternatively, the servo pattern to be written on any other disk surface may be modified so that a servo pattern enabling higher-precision control of positioning can be written.

Figure 15:
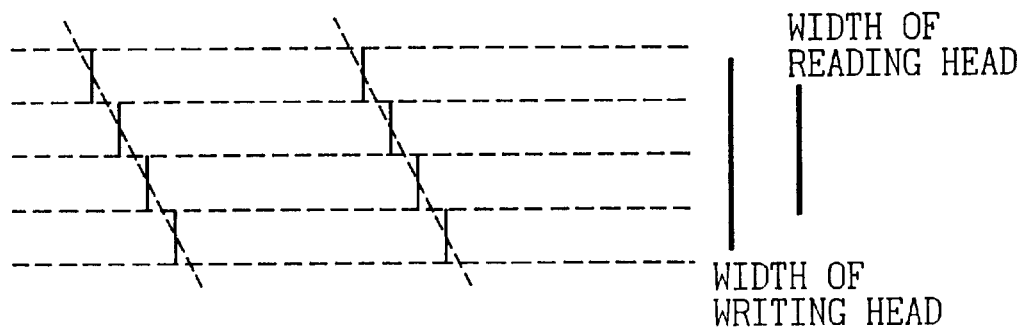
FIG. 15 is a diagram showing an ideal phase servo pattern.

FIG. 15 is a diagram showing an ideal phase servo pattern. A pattern indicated with inclined dashed lines is preferably recorded as a servo pattern. However, it is physically impossible to write such a pattern. In reality, a wide writing head is repeatedly moved in units of, for example, a quarter track for step-by-step writing. A written pattern is therefore stepped. A position signal produced by a reading head that reads the pattern suffers from cyclic errors even when the positions occupied by the pattern are not deviated.

Figure 16:
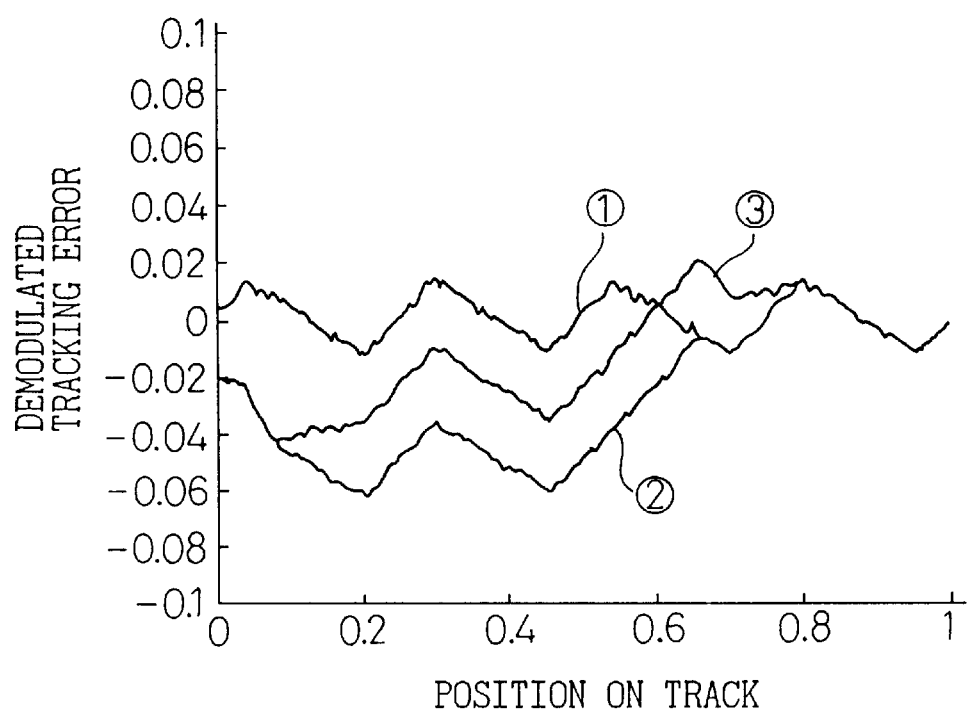
FIG. 16 graphically illustrates data indicating the effect of phase correction.

FIG. 16 is a diagram showing examples of a position signal produced by a reading head. A signal <1> is a wave acquired when a pattern suffers from no positional deviation. As illustrated, the signal <1> alternates cyclically at intervals of a pitch of a quarter track.

When servo information on a master surface is used to control positioning and to write a servo pattern on any other surface of disks, if an error occurs in positioning, a servo pattern affected by the error is written. In the case of a phase servo method, the phases of a signal having a single frequency which is produced by reading a written servo pattern indicate positions along a track. Correction can therefore be achieved by adjusting the phases according to a positional deviation occurring during writing.

Figures 17A, 17B, 17C:
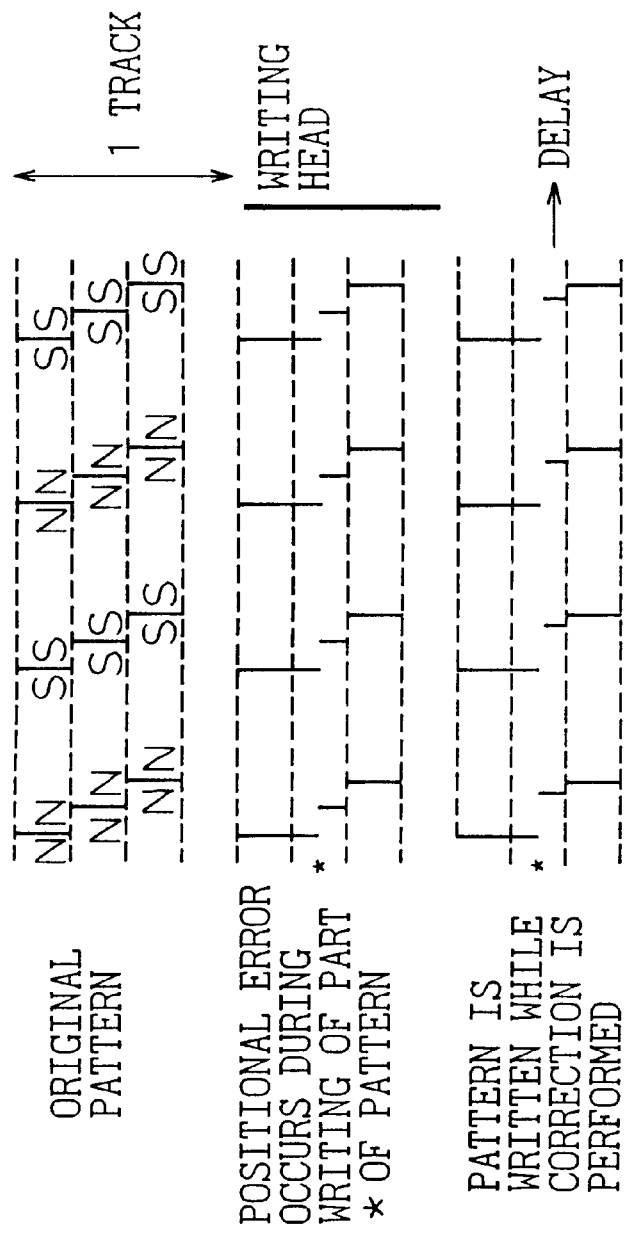
FIGS. 17A to 17C are diagrams for explaining the principles of correction in the fourth embodiment of the present invention.

FIGS. 17A to 17C are diagrams for explaining the principles of correction to be performed when the phase servo method in accordance with the fourth embodiment is employed. FIG. 17A shows an ideal pattern, which is the same as the one shown in FIG. 15, to be written when a writing head is moved in units of a quarter track for step-by-step writing. FIG. 17B shows a pattern written when a positional deviation occurs along a track during writing of part * of the pattern. FIG. 17C shows a pattern written while correction is performed.

FIG. 17A shows an ideal pattern, while FIG. 17B shows a pattern affected by a positional error occurring along a track during writing of part * of the pattern. However, no positional error should occur during writing of three other parts of the pattern on the same track. Without correction, as shown in FIG. 17B, a pattern is written at the same positions as the ones of the ideal pattern, but the upper part of the pattern becomes longer and part * thereof becomes shorter. A signal produced by reading the pattern using an illustrated head is a signal <2> in FIG. 16. By contrast, in the fourth embodiment, when part * of the pattern affected by a positional error is to be written, as shown in FIG. 17C, a position in a circumferential direction at which the part * should be written is deviated, that is, the phase of a corresponding signal component is shifted. When the pattern in FIG. 17C is read, a signal <3> in FIG. 16 is produced. Apparently, the magnitude of a positional error affecting the signal <3> is smaller than that of a positional error affecting in the signal <2> that has not undergone correction.

Figure 18:
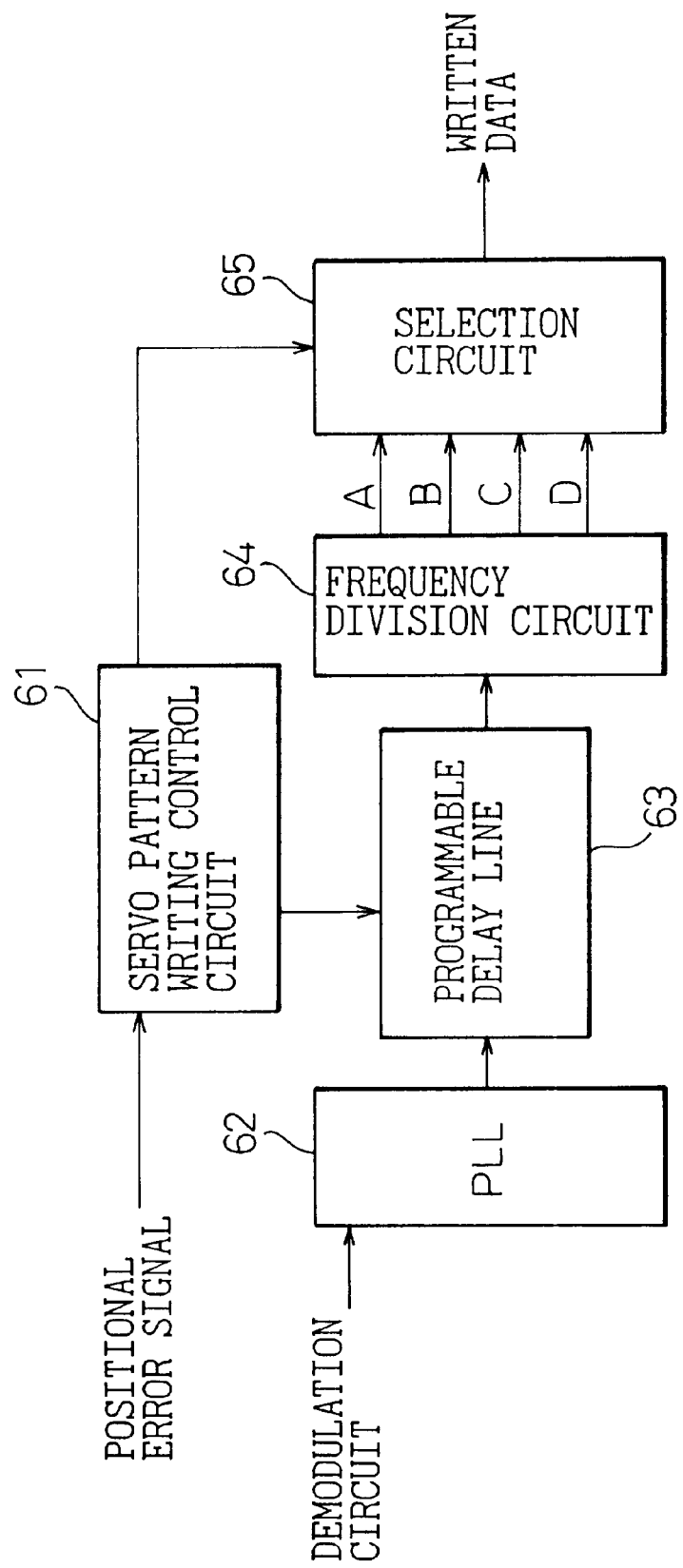
FIG. 18 is a diagram showing the configuration of a phase adjustment circuit for correcting the phase of a signal indicating a position at which data is written.

FIG. 18 is a block diagram showing the configuration of a phase adjustment circuit for adjusting positions, at which a servo pattern is written, according to an error signal in the fourth embodiment. FIGS. 19A and 19B are diagrams showing signals produced by the phase adjustment circuit and patterns to be written.

As shown in FIG. 18, a demodulated signal to be reproduced by reading a master servo pattern is input from a demodulation circuit to a PLL 62. An output of the PLL 62 is delayed by a delay specified by a servo pattern writing control circuit 61 by a programmable delay line 63 capable of adjusting a delay. A frequency division circuit 64 produces signals A, B, C, and D corresponding to signals acquired by displacing a head in units of a quarter track. The signals A, B, C, and D are selected one by one, in order, by a selection circuit 65, and output as written data. As shown in FIG. 19A, when no positional error occurs, signals A, B, C, and D that undergo the same phase shift are output, and a pattern shown in FIG. 19A is written on a medium. When the signal C is written, if a positional error occurs, as shown in FIG. 19B, the signal C is delayed, and thus the position on the medium at which the signal C is to be written is deviated.

Next, a method of determining a delay implemented in the servo pattern writing control circuit 61 will be described. For example, assuming that a pitch between tracks, Tp, is 2.54 micrometers, the cycle of phase servo control is four tracks, and an interval at intervals of which a servo pattern appears (the frequency of a servo signal) is 66.67 nsec. (15 MHz), a delay Tcmp relative to a deviation in a direction of tracks of 0.1 micrometer is calculated as 0.1*66.67/(2.54*4)=0.656 nsec.

Writing a servo pattern is carried out on the basis of a read signal produced by reading a master servo pattern. Servo control is accompanied by a time lag. A signal produced by reading a master servo pattern is therefore used as a position error signal, whereby a swing (NRRO: non-repeatable runout) occurring during writing and deriving from a servo system can be corrected. Examples shown in FIGS. 17A to 17C and FIGS. 19A and 19B relate to this correction.

Alternatively, a signal produced by a power amplifier for driving a VCM may be used as a positional error signal. By correcting a positional error indicated by the signal, a swing deriving from eccentricity or a cyclic swing (PRO: repeatable runout) written on a master surface can be corrected.

As described so far, according to the present invention, since a servo pattern can be written on one disk, a high-precision servo pattern can be written. Moreover, since writing a servo pattern on any other disk surface can be carried out after a disk drive is sealed up, the amount of work to be performed in a clean room, as conventionally done, can be reduced. Consequently, production can be improved. Furthermore, a problem occurring when disks are assembled after a servo pattern is written on each surface of disks using an STW in order to improve the precision of a servo signal, that is, a problem that positions on a plurality of disks on which a servo signal is written are deviated from one another can be avoided.

What is claimed is:

1. A servo pattern writing method for magnetic disk drives having a plurality of surfaces on a plurality of disks, a selected one of the plurality of surfaces being a master surface and remaining the surfaces being secondary surfaces, said method comprising the steps of:

writing a master servo pattern on the master surface;

sampling the master servo pattern with a read head;

positioning a write head over the secondary surfaces on the basis of said sampled master servo pattern; and writing secondary servo patterns on the secondary surfaces;

wherein the master servo pattern and the secondary servo patterns are each information written in a circumferential direction of the disks, and a total length per circumference of a radius on which the master servo pattern is written is greater than a total length per circumference of said radius on which each secondary servo pattern is written.

2. A servo pattern writing method for magnetic disk drives according to claim 1, wherein said master servo pattern is written on said master surface before said master surface is incorporated in a main unit of said magnetic disk drive.

3. A servo pattern writing method for magnetic disk drives according to claim 1, wherein a number of tracks on which said master servo pattern is recorded is greater than a number of tracks on which said secondary servo pattern is recorded on any one of said plurality of secondary surfaces.

4. A servo pattern writing method for magnetic disk drives according to claim 1, wherein the master servo pattern and the secondary servo patterns are written discretely in a circumferential direction of the disks, and a number of areas in which the master servo pattern information is written, per circumference, is greater than a number of areas in which the secondary servo pattern information is written on any one of the plurality of secondary surfaces, per circumference.

5. A servo pattern writing method for magnetic disk drives according to claim 1, wherein the master servo pattern and the secondary servo patterns are written discretely in a circumferential direction of the disks, and a length of each area in which the master servo pattern information is written is greater than a length of each area in which each secondary servo pattern information is written.

6. A servo pattern writing method for magnetic disk drives according to claim 4, wherein the master servo pattern includes a first pattern corresponding to each secondary servo pattern and extra PLL information.

7. A servo pattern writing method for magnetic disk drives according to claim 1, wherein part of the master servo pattern other than a first pattern corresponding to each secondary servo pattern is deleted after the secondary servo patterns are written on the secondary surfaces.

8. A servo pattern writing method for magnetic disk drives according to claim 1, wherein the secondary servo patterns are written at positions deviated in a direction of rotation from the positions occupied by the master servo pattern.

9. A servo pattern writing method for magnetic disk drives according to claim 1, wherein a first range of tracks on which the master servo pattern is recorded exceeds a range reachable by a read/write head.

10. A servo pattern writing method for magnetic disk drives according to claim 1, wherein when said secondary servo pattern is written, the phase of a signal representing said secondary servo pattern is shifted according to a positional error signal produced by reading said master servo pattern.

11. A servo pattern writing method for magnetic disk drives according to claim 1, wherein when said secondary servo pattern is written, the phase of a signal representing said secondary servo pattern is shifted by a designated value.

12. A servo pattern writing method for magnetic disk drives according to claim 1, wherein when the secondary servo pattern is written, the phase of a signal representing the secondary servo pattern is shifted by a phase determined with the positional error signal and designated value.

13. A magnetic disk drive having a plurality of surfaces of disks, one of the plurality of surfaces being a master surface and remaining the surfaces being secondary surfaces, said magnetic disk drive comprising:

a positioning control circuit for positioning heads relative to the secondary surfaces by sampling a master servo pattern written on the master surface; and a servo pattern writing control circuit for writing the secondary servo patterns on the secondary surfaces, while the positioning control circuit is performing positioning;

wherein the master servo pattern and the secondary servo patterns are each information written in a circumferential direction of the disks, and a total length per circumference of a radius on which the master servo pattern is written is greater than a total length per circumference of said radius on which the secondary servo pattern is written.

14. A magnetic disk drive according to claim 13, wherein said disk having said master surface is incorporated in a main unit of said disk drive after said master servo pattern is recorded thereon.

15. A magnetic disk drive according to claim 13, wherein a number of tracks on which said master servo pattern is recorded is greater than a number of tracks on which said secondary servo pattern is recorded on any one of said plurality of secondary surfaces.

16. A magnetic disk drive according to claim 13, wherein part of the master servo pattern other than a first pattern corresponding to each secondary servo pattern is deleted after the secondary servo patterns are written on the secondary surfaces.

17. A magnetic disk drive according to claim 13, wherein the secondary servo patterns are written at positions deviated in a direction of rotation from the positions occupied by the master servo pattern.

18. A magnetic disk drive according to claim 14, wherein a first range of tracks on which the master servo pattern is recorded exceeds a range reachable by a read/write head.

19. A magnetic disk drive according to claim 13, wherein when writing said secondary servo pattern, said servo pattern writing control circuit shifts the phase of a signal representing said secondary servo pattern according to a positional error signal output from said positioning control circuit.

20. A magnetic disk drive according to claim 13, wherein when writing said secondary servo pattern, said servo pattern writing control circuit shifts the phase of a signal representing said secondary servo pattern by a designated value.

21. A magnetic disk drive according to claim 13, wherein a first signal representing said master servo pattern is out of phase with a second signal representing said secondary servo pattern.

22. A magnetic disk drive according to claim 13, wherein the number of tracks used to store the master servo pattern is larger than the number of tracks used to store the secondary servo pattern.

* * * * *